United States Patent [19]
von Keyserling

[11] Patent Number: 6,065,557
[45] Date of Patent: May 23, 2000

[54] POWER ASSIST ASSEMBLY FOR WHEELED VEHICLES

[76] Inventor: Peter H. von Keyserling, Rte. 2, Box 645, P.O. Box 10, Kents Store, Va. 23084

[21] Appl. No.: 09/053,450

[22] Filed: Apr. 1, 1998

[51] Int. Cl.[7] .................................................. B62M 7/08
[52] U.S. Cl. .................. 180/221; 180/65.1; 180/342; 180/907
[58] Field of Search .................. 180/220, 221, 180/65.1, 69.6, 342, 343, 250.1, 907; 476/64

[56] References Cited

U.S. PATENT DOCUMENTS

| | | |
|---|---|---|
| 627,066 | 6/1899 | Schnepf . |
| 633,484 | 9/1899 | Pond . |
| 1,158,311 | 10/1915 | Schunk . |
| 1,409,454 | 3/1922 | Kolaczkowski . |
| 1,436,788 | 11/1922 | Baker . |
| 1,442,556 | 1/1923 | Bharucha . |
| 2,409,887 | 10/1946 | Murphy . |
| 2,451,965 | 10/1948 | Longenecker . |
| 2,493,275 | 1/1950 | Thornton . |
| 2,578,886 | 12/1951 | Isherwood et al. . |
| 3,431,994 | 3/1969 | Wood, Jr. . |
| 3,841,428 | 10/1974 | Bialek . |
| 3,878,910 | 4/1975 | Walker, Jr. .................. 180/221 X |
| 3,961,678 | 6/1976 | Hirano et al. . |
| 3,978,936 | 9/1976 | Schwartz . |
| 4,227,589 | 10/1980 | Chika . |
| 4,406,342 | 9/1983 | Lacroix .................. 180/221 X |
| 4,579,188 | 4/1986 | Facer . |
| 4,637,274 | 1/1987 | Goldenfeld . |
| 4,974,695 | 12/1990 | Politte . |
| 5,069,304 | 12/1991 | Mann . |
| 5,078,227 | 1/1992 | Becker . |
| 5,316,101 | 5/1994 | Gannon . |
| 5,423,393 | 6/1995 | Felt .................. 180/221 |
| 5,491,390 | 2/1996 | McGreen . |
| 5,513,721 | 5/1996 | Ogawa et al. . |
| 5,603,388 | 2/1997 | Yaguchi . |
| 5,662,187 | 9/1997 | McGovern . |
| 5,671,821 | 9/1997 | McGreen . |
| 5,704,441 | 1/1998 | Li . |
| 5,735,363 | 4/1998 | Horvitz et al. .................. 180/221 X |
| 5,816,355 | 10/1998 | Battlogg et al. .................. 180/221 |
| 5,842,535 | 12/1998 | Dennis .................. 180/221 X |

*Primary Examiner*—Michael Mar
*Attorney, Agent, or Firm*—Neil F. Markva

[57] ABSTRACT

The assembly of the invention provides a direct frictional drive system for a wheeled vehicle having a vehicle frame whereby at least one drive roller is in frictional contact with a vehicle wheel, which includes a hub portion having a wheel axle, a rim portion, and a tire portion having a tread surface. The assembly comprises an assembly frame structure including an upper frame portion, an upper drive roller carrier portion, and a lower wheel axle coupling portion for attaching the assembly to a hub portion of the vehicle frame. The upper frame portion is connectable to the vehicle frame and the drive roller carrier portion rotatably supports at least one drive roller in frictional contact with the tread portion. A drive motor mounted to the drive roller carrier portion rotates the drive roller when the motor is activated.

18 Claims, 6 Drawing Sheets

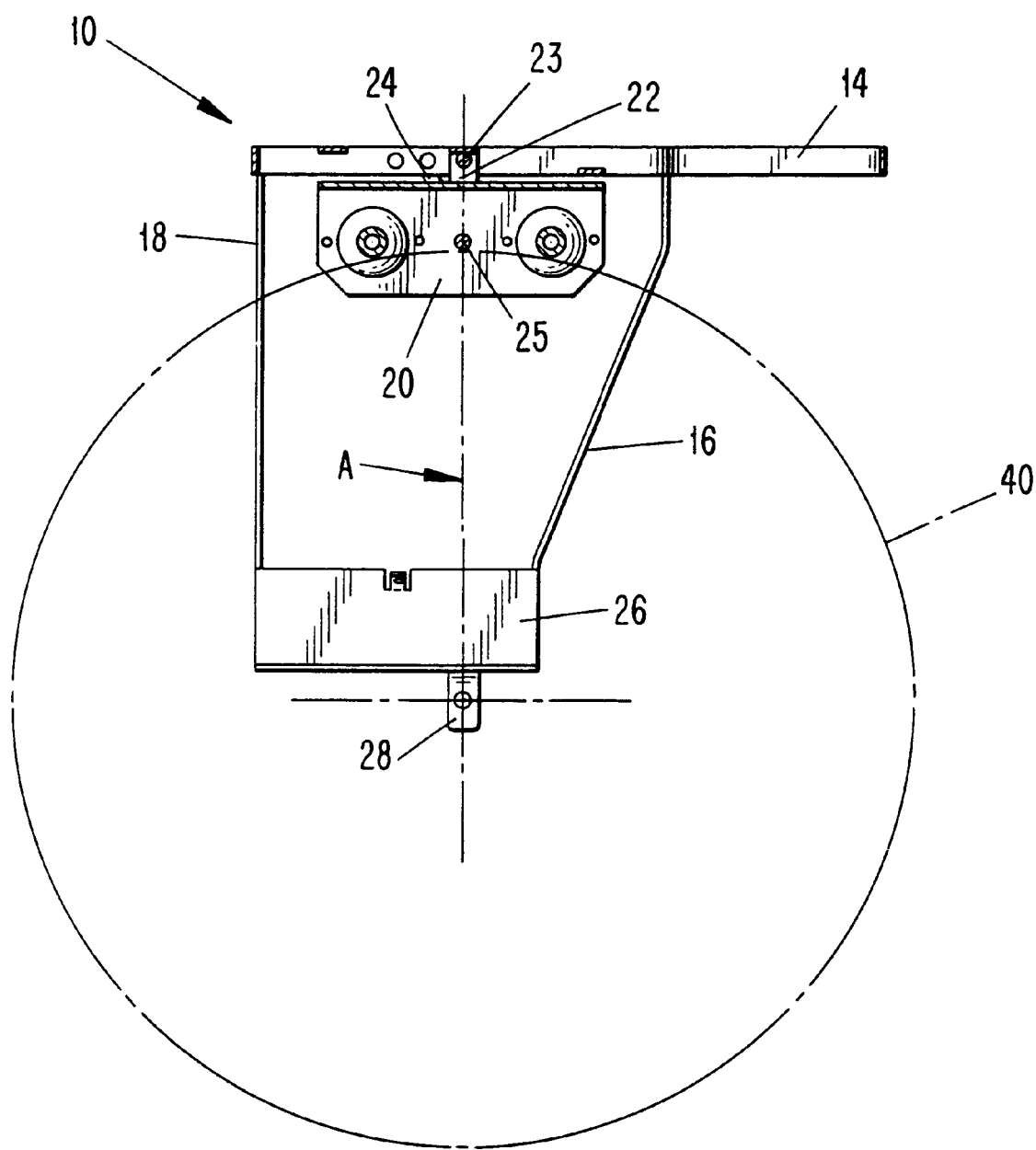

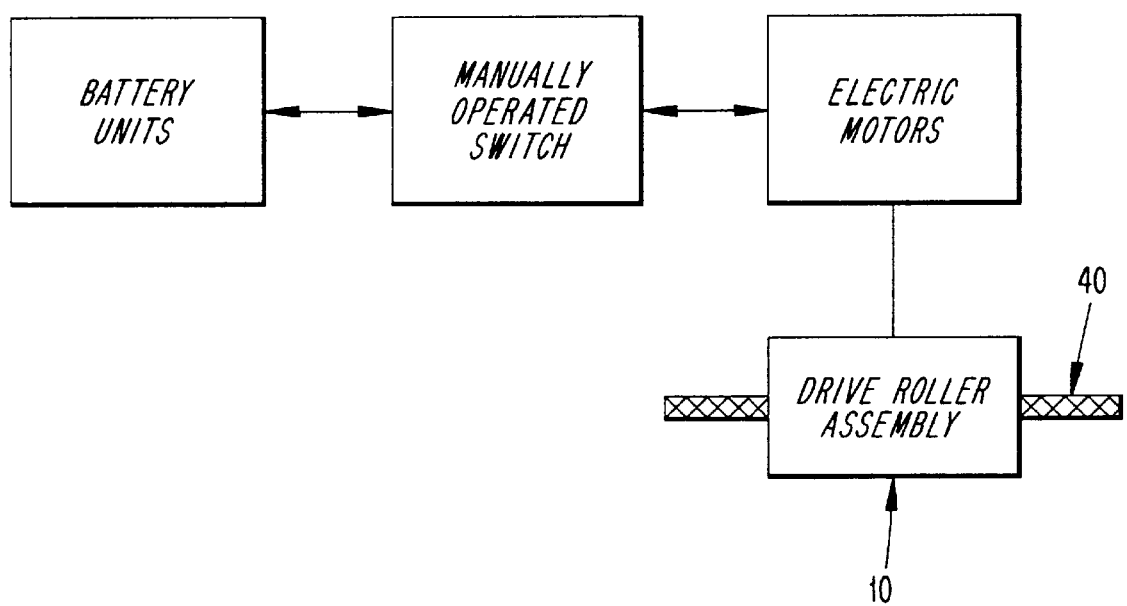

POWER ASSIST ASSEMBLY FOR WHEELED VEHICLES

FIELD OF THE INVENTION

This invention relates to an electric drive assist for a wheeled vehicle having a primary power source. More specifically, the invention relates to an auxiliary drive assist for a bicycle or any other type multi-wheeled vehicle where the drive assist uses electrical battery-powered drive motors.

BACKGROUND OF THE INVENTION

The use of a motor-driven concave friction drive wheel as an auxiliary drive unit for a bicycle is well known. The pedal system is the primary system with an electric direct current (dc) motor power source (U.S. Pat. No. 627,066) or a gas-driven power source (U.S. Pat. No. 633,484) mounted to the frame structure of the bicycle. The concave drive wheel of U.S. Pat. No. 1,158,311 is mounted to an engine drive shaft and a spring tension member is used to maintain a positive drive contact with a rear tire tread surface.

U.S. Pat. Nos. 1,436,788; 2,578,886; 3,431,994; and 4,974,695 each discloses a concave friction drive wheel that engages the tire tread surface to provide a power assist to a bicycle or a similar vehicle. U.S. Pat. No. 1,436,788 more specifically discloses two concave wheels for frictionally driving the rear wheel of a bicycle using a single electrically powered drive motor. The concave drive wheel of U.S. Pat. No. 4,974,695 is designed to engage as large an area of the motorcycle tire as possible for driving it in reverse without the use of the motorcycle engine or transmission structure.

U.S. Pat. Nos. 2,451,965 and 2,493,275 disclose a pair of drive wheels in systems for frictionally contacting the tread surface of a bicycle tire. In each instance, however, the pair of drive wheels is used with either a belt or only one of the drive wheels is in direct contact with the tire during operation. U.S. Pat. No. 2,578,886; 3,431,994; and 4,974,695 each discloses a concave shaped drive wheel for various frictional drive systems. None of these prior systems, however, disclose a dual concave drive system like that of this invention.

The following patents disclose different drive roller configurations and surface styles (smooth and roughened) for wheels that frictionally drive the balloon tire of the vehicle wheel being driven. 2,409,887 4,227,589 5,069,304 5,078,227 5,316,101

U.S. Pat. Nos. 1,409,454 and 1,442,556 show mechanisms that act directly on the bicycle tire being driven. As shown, an electric dc motor with a battery power supply is well known for use with a drive system of the invention. While various components of the invention are shown in the prior art, none of the references shows the specific structural configuration of drive roller assembly of the invention.

U.S. Pat. No. 5,078,227 discloses a retrofit device that provides an auxiliary electrical drive mechanism for vehicles such as bicycles and wheelchairs. The system includes first and second electric motors each used with a friction drive element and apparatus for selectively bringing the friction drive elements into operative driving engagement with both the rim and tire of the vehicle wheel to effect a frictional driving function. More specifically, each of the electric motors are pivotally mounted about a single pivot point whereby the first and second motors can maintain a driving engagement with the vehicle wheel regardless of the eccentricities of the wheel. Unlike the invention, this known system does not contact the tread portion to drive the wheel.

U.S. Pat. No. 5,316,101 discloses an electric propulsion system for a multi-wheeled vehicle using a solar charging mechanism. The standard components of a typical electric bicycle include a bicycle, a conventional battery, a dc electric motor, drive means for mechanically connecting the motor with a vehicle wheel, and a means for electrically connecting the battery to the motor for rotating the drive wheel when it is in frictional contact with the vehicle wheel. It is known for a pedal and motor power to function in combination to add range between recharges of the battery and improve speed and hill climbing ability. As in the invention, some known regenerative braking systems include a motor that acts as a generator when slowing or stopping to convert the forward momentum of the bicycle and rider into a charging current to restore energy to the battery.

U.S. Pat. No. 5,603,388 discloses a pair of drive rollers which act on opposing sides of the vehicle wheel to effect the desired power assist.

U.S. Pat. Nos. 5,491,390 and 5,671,821 disclose an electric propulsion system for a bicycle having a battery-powered drive roller that is designed to operate with any type of the tread surface using a cylindrically-shaped drive member.

U.S. Pat. No. 3,978,936 discloses a retrofit system having a means for selectively engaging the drive wheel with the vehicle wheel. U.S. Pat. Nos. 3,841,428; 3,961,678; 4,579,188; and 5,078,227 disclose various auxiliary attachments for a multi-wheeled vehicle. U.S. Pat. No. 3,961,678 particularly shows a frame member mounted to a rear wheel frame structure to mount the drive wheel mechanism above the vehicle wheel.

U.S. Pat. No. 5,513,721 discloses a particular cover structure and battery storing case for an electric-powered vehicle. U.S. Pat. Nos. 4,637,274; 5,662,187; and 5,704,441 disclose various types of drive mechanisms designed for operating within the vehicle pedal mechanism to assist the driver.

Most of the known systems perform poorly on wet tire surfaces and require relatively smooth tire tread to maintain drive friction.

PURPOSE OF THE INVENTION

A primary object of the invention is to provide a simple and effective drive system for wheeled vehicles such as wheelchairs, three-wheeled carts, bicycles and as generally shown in the prior art, and that operates with low maintenance, mechanical and electrical simplicity, efficient and effective performance, and simple installation and removal as a retrofit system.

Another object of the invention is to provide an electrical power system with a very simple electrical circuit, which improves power efficiency and reduces maintenance and repair complexity using four components which include two drive motors, wires connecting each drive motor to a battery pack, and a manually operated switch for engaging and disengaging the power to the motors.

A further object of the invention is to provide a retrofit frame assembly including two drive motors mounted to a carrier mechanism that is pivotally mounted to the frame and cams itself into positive drive engagement against the tire tread surface when the motors are activated.

A particular object of this invention is to provide a dual drive roller system, which provides a smooth acceleration and drive performance that does not depend on the degree of dryness or wetness of the tire tread surface or the particular tread design.

A further object of the invention is to provide a three-point connecting frame structure, which fixes a dual drive wheel mechanism at a driving position with respect to the vehicle wheel and at a critical location with respect to the axis of rotation of the driven wheel.

A still further object of the invention is to provide a system for people having low mechanical ability to install and remove the system for driving a wheeled vehicle with a power assist.

Another object of the invention is to provide a retrofit unit designed for limited-to-zero slip driving on either the front or rear tire or both of the tires of a bicycle.

A further object of the invention is to provide two high pressure contact points on a driven tire tread with two smooth concave drive rollers that are effective to drive both smooth and knobby tire treads without requiring constant adjustment within the novel system to maintain optimum performance.

SUMMARY OF THE INVENTION

The assembly of the invention provides a direct frictional drive means for a vehicle wheel. The drive means is mounted to the vehicle frame and is in frictional contact with a vehicle wheel, which includes a hub portion having a wheel axle, a rim portion, and a tire portion having a tread surface. The assembly comprises an assembly frame structure including an upper frame portion, an upper drive roller carrier portion, and a lower wheel axle coupling portion for attaching the assembly to a hub portion of the vehicle frame. The upper frame portion is connectable to the vehicle frame and the drive roller carrier portion rotatably supports at least one drive roller in frictional contact with the tread portion. Drive motor means mounted to the drive roller carrier portion rotates each drive roller when the motor means is activated.

The drive roller carrier portion of the invention is mounted to the upper frame portion to move in response to a torque force created when the drive motor means is activated. A camming movement of the drive roller carrier portion is thus produced in a direction opposite to the direction of travel of the vehicle. The camming action provides the necessary pressure to eliminate slippage between the drive wheels or rollers and the tire surface under most driving conditions. Some slippage is desirable upon startup to provide smooth acceleration but is controlled so as not to produce significant tire wear. The system is designed so that the velocity of the driving roller surface is the same as the velocity of the wheel tread surface at the point of driving contact as the vehicle wheel rotates. The upper frame portion includes camming movement limit means for contiguously disposing the at least one drive roller against the tire tread surface at a roller driving position for frictionally causing the vehicle wheel to rotate about an axis of wheel rotation. Power supply means is mounted to the vehicle frame for operating the drive motor means.

A feature of the invention is that the drive roller carrier portion is effective to provide a first continuous back and forth alignment of the at least one drive roller with respect to the tread portion as the vehicle wheel rotates, and a second continuous in and out positive radial contact between the at least one drive roller and the rotating wheel tread portion. The drive motor means is electrically operated, and the power supply means includes battery means, coupling means for electrically connecting the battery means to the drive motor means, and switch means for turning the drive motor means on and off.

In a specific embodiment, the battery means includes two battery units, and the frame structure includes means for mounting one of the battery units on opposing sides of the vehicle wheel being driven. Each battery unit is disposed on a wheel axle coupling portion at a low center of gravity for the vehicle on which the assembly is mounted. Two laterally spaced drive rollers frictionally contact the tire tread portion at two separate spaced locations along the circumference of the driven wheel. The drive rollers pivotally adjust about a horizontal pivot axis in response to any radial variation in the vehicle wheel as it rotates around its axis of rotation, which is parallel to the horizontal pivot axis. The drive rollers also pivotally adjust about a radial pivot axis that is disposed with the horizontal pivot axis in a plane that extends through and is parallel to the axis of wheel rotation.

The assembly of the invention comprises support means for contiguously disposing two laterally spaced drive rollers at two separate locations against the tread portion for frictionally causing the vehicle wheel to rotate about an axis of wheel rotation. The support means includes carrier means for rotatably supporting the drive rollers and is effective to maintain the drive rollers in frictional driving contact with the tread portion. The support means also includes first means for providing a continuous back and forth alignment of the drive rollers with respect to the tread portion as the vehicle wheel rotates and second means to maintain a continuously in and out positive radial contact between the drive rollers and the tread portion of the rotating vehicle wheel. Electric power drive means is mounted to the support means for rotating the drive rollers and includes electrically powered motor means, battery means, and electric coupling means including switch means for electrically connecting the battery to the motor means.

A particular feature of the invention is directed to the drive roller carrier means which is pivotally mounted to the stationary assembly frame portion that is laterally disposed outwardly from the vehicle wheel being driven. The carrier means rotatably carries two laterally spaced drive rollers at a fixed distance from each other. The first means includes coupling means floatingly connecting the drive roller carrier means within the assembly frame portion to provide limited rotational movement of the drive roller carrier means about a radial pivot axis that extends through the axis of wheel rotation. Each of the drive rollers mounted to the carrier means is disposed on an opposing side of the radial pivot axis with respect to each other.

In a specific embodiment, the drive roller carrier means comprises a carrier element including two drive roller carrying sections extending outwardly from an intermediate connecting section. The coupling means includes carrier linking means, which extends from the stationary assembly frame portion in a direction toward the vehicle wheel and has an outer end section. The second means includes connection means rotatably connecting the carrier element to the frame assembly portion to pivotally rotate about a horizontal pivot axis that extends in a direction parallel to the axis of wheel rotation with the drive rollers being disposed on opposing sides of the horizontal pivot axis.

The support means includes limiting means for maintaining the radial pivot axis and the horizontal pivot axis each disposed in a plane that extends through and is parallel to the axis of wheel rotation. More specifically, the carrier element comprises an elongated U-shaped channel member having two parallel sidewall sections extending outwardly from a middle section with the drive rollers being rotatably mounted to and located between the sidewall sections. The carrier linking means includes a U-shaped connecting member having two linking arms each projecting along an opposing sidewall section of the U-shaped channel member. The carrier linking means includes outer free ends that are pivotally connected to the sidewall sections at the horizontal pivot axis.

The assembly of the invention is also described as comprising carrier means for contacting two rotatably mounted laterally spaced drive rollers at two separate locations against the tread portion of a vehicle wheel. Consequently, both drive rollers are effective to frictionally drive the vehicle wheel to rotate about an axis of wheel rotation. Each drive roller has a longitudinal axis that is parallel to the axis of wheel rotation when the drive rollers are contiguous to the tire tread portion. Carrier mounting means is effective to allow automatic adjustment of the carrier means to effect movable alignment of the drive rollers to any back and forth movement of the tread portion in a first direction parallel to the axis of wheel rotation and further to any in and out movement of the tread portion in a second direction normal to the axis of wheel rotation to maintain substantially continuous frictional drive contact between the drive rollers and tread portion. Drive means is effective to rotate the drive rollers when they are in frictional contact with the tread portion to cause rotation of the vehicle wheel.

Another feature of the invention is directed to carrier mounting means that is effective to shift the drive roller carrier means about a first axis extending radially outwardly from the axis of wheel rotation and additionally to pivot about a second axis extending in a direction parallel to the axis of wheel rotation. Each of the drive rollers are located on opposing sides of the first and second axes when they are in frictional driving contact with the tread portion. The carrier mounting means thus includes means to floatingly adjust the carrier means to provide a continuous back and forth alignment of the drive rollers with respect to the tread portion as the vehicle wheel rotates and means to maintain a continuously in and out positive radial contact between the drive rollers and tread portion of the rotating vehicle wheel.

The assembly of the invention maintains the velocity of each of the rotating contiguous circumferential surfaces of the drive rollers and the driven vehicle wheel substantially the same at their points of contact to preclude slippage between the two contiguous surfaces thereby minimizing consequent wear of the outer cicumferential surface of the driven wheel. The structure of the invention compensates for any inherent back and forth wobbling of the rotating vehicle wheel and at the same time adjusts to any out-of-roundness that may produce a variance in the vehicle wheel's circumferential radius.

In a specific embodiment, the drive means includes electric motor means mounted to the carrier means for rotating each drive roller that is fixed to the motor drive shaft. Each drive roller includes an outer circumferential surface having a smooth tire contact portion to minimize wear of the tread portion if any slippage occurs between the circumferential surfaces of the drive wheels and tire tread portion. And the outer circumferential concave surface of each drive roller includes an upwardly curved portion. The concave structure along a direction parallel to the longitudinal axis of the roller provides a delimited amount of back and forth movement of the drive rollers in frictional contact with tire tread.

A more specific feature of the invention is directed to the use of the assembly on a vehicle, such as a bicycle, which includes a primary driving power source so that its power drive means for the drive rollers is a secondary driving power source. A bicycle has a seat mounted to frame means and its wheels each includes a hub portion having a wheel axle, a rim portion, and a tire portion having a tread surface. The support means includes an assembly frame portion having a drive roller carrier portion, a wheel coupling portion, and means for mounting battery means. The assembly frame portion includes means for attaching the support means to the bicycle frame means.

Another feature of the assembly comprises an assembly frame portion including a drive roller carrier portion and a wheel axle coupling portion for attaching the assembly to the vehicle frame. Attachment means has a structural configuration effective to stabilize the drive roller carrier portion with respect to the vehicle frame for locating the carrier portion outwardly spaced from the wheel. Fastening means removably connect the lower wheel axle coupling portion to the hub portion. The drive roller carrier portion includes carrier means for contiguously disposing at least one drive roller against the tire tread surface for frictionally causing the vehicle wheel to rotate about an axis of rotation. Power drive means is mounted to the carrier means for rotating the drive roller when it is in frictional contact with the tread surface.

In a specific embodiment, the drive roller carrier portion includes carrier means for rotatably supporting the drive rollers. Carrier mounting means is effective to movably dispose the carrier means for maintaining the drive rollers in frictional driving contact with the tire tread portion. The movably mounted carrier means provides a first continuous back and forth alignment of the drive rollers with respect to the tread portion as the vehicle wheel rotates and a second continuous in and out positive radial contact between said drive wheels and the tread portion of the rotating vehicle wheel.

The power drive means of the specific embodiment includes battery means, electric motor means mounted to the carrier means for drivingly rotating the drive rollers, and coupling means for electrically connecting the battery means to the motor means. The battery means includes two batteries with a battery unit being disposed on a wheel axle coupling portion and located on each side of the vehicle wheel being driven. The battery units are located on the assembly in a manner to produce the lowest possible center of gravity for the vehicle on which the assembly is mounted. Two laterally spaced drive rollers frictionally contact the tread portion at two separate locations to pivotally adjust to any wobbling and/or out-of-roundness of the vehicle wheel.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 5 is a side elevational view partly in section showing the disposition of the assembly of the invention mounted with respect to a vehicle wheel being driven; and FIG. 6 is a diagram of the electrical circuit of the invention.

DETAILED DESCRIPTION OF THE INVENTION

Figure 1:
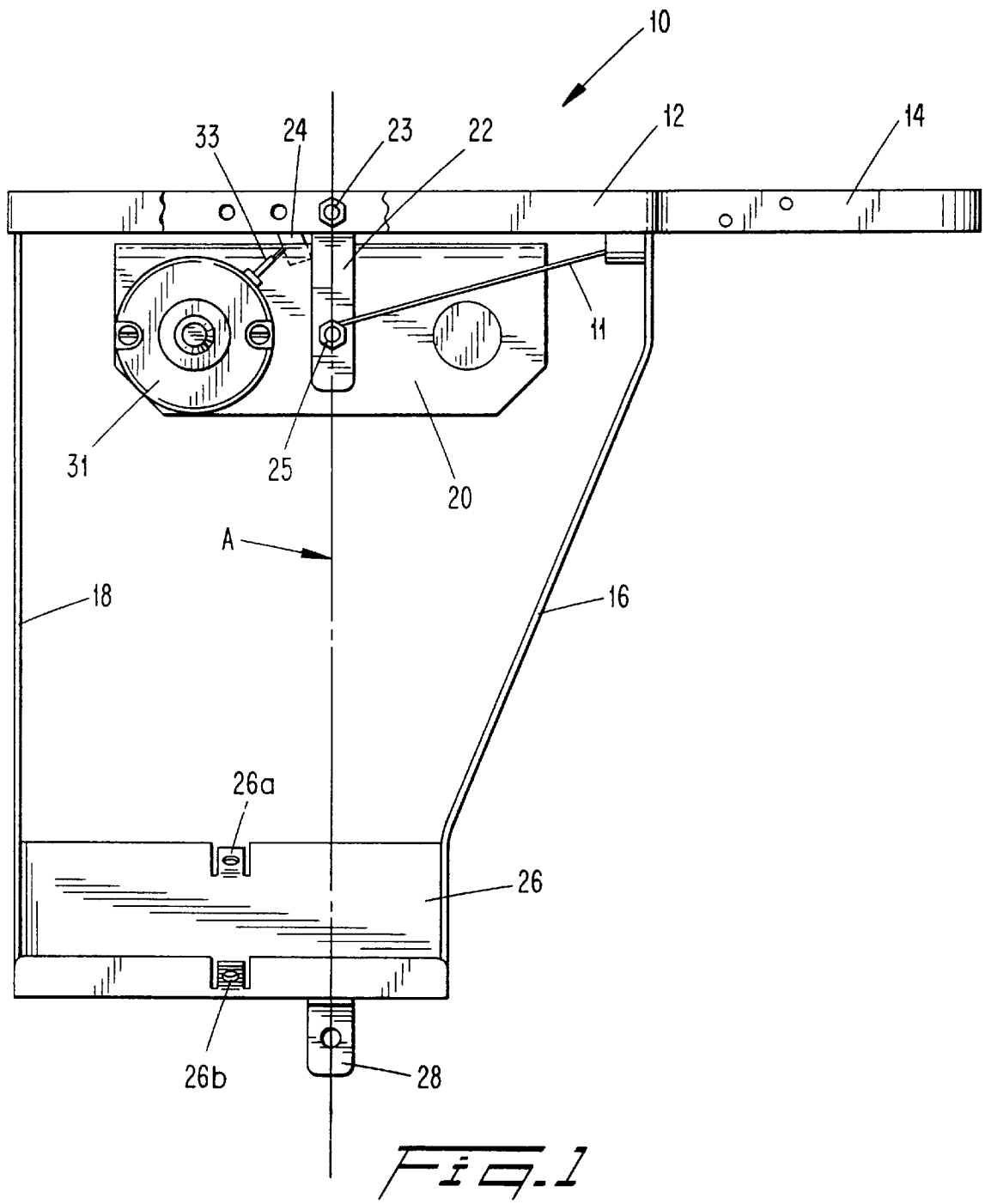
FIG. 1 is a side elevational view of the assembly made in accordance with the invention.
Figure 2:
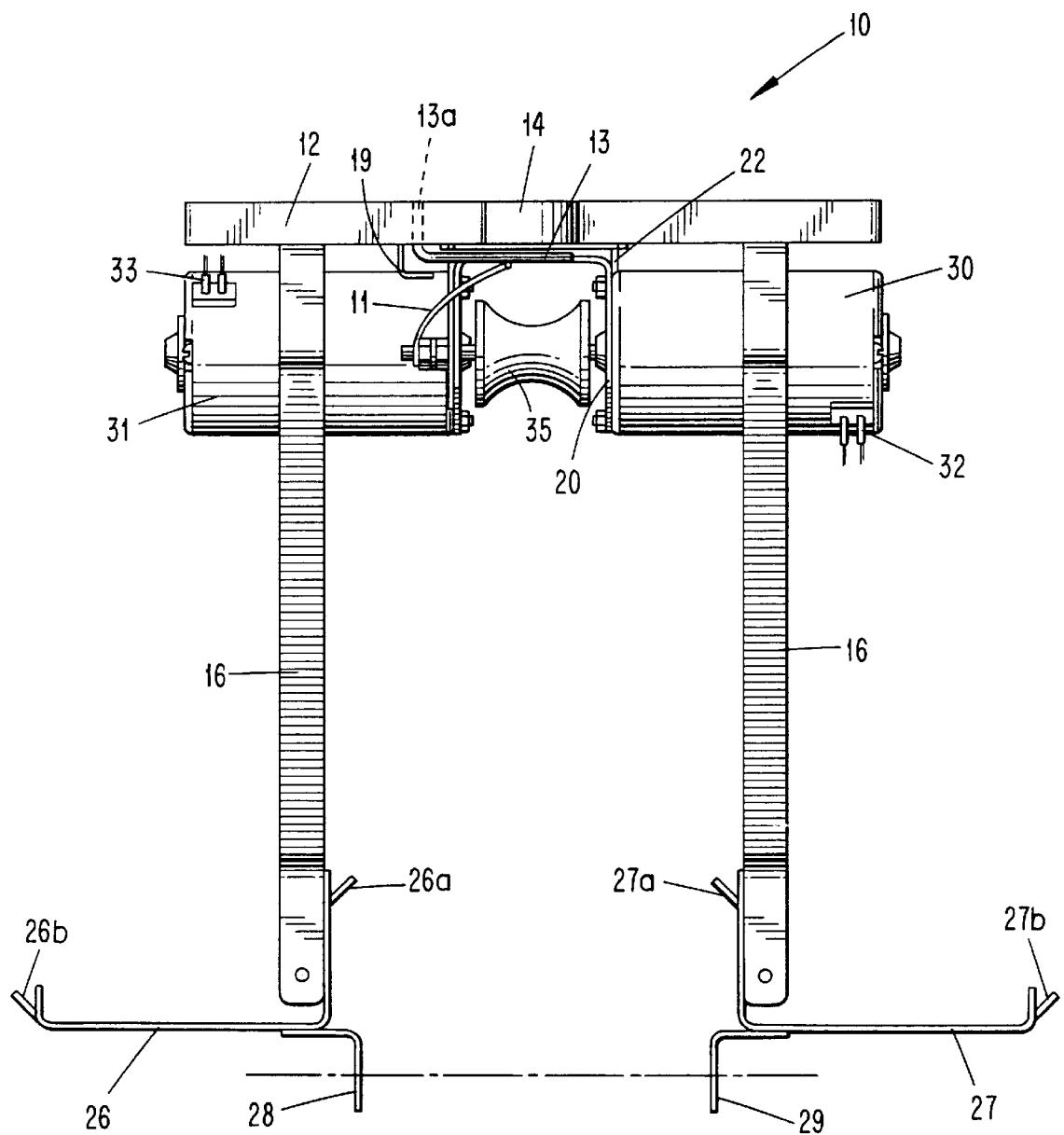
FIG. 2 is a front elevational view of the assembly of the invention.

As shown in the drawings, the assembly, generally designated 10, includes an assembly frame structure including an assembly frame portion 12 and drive roller carrier 20 and a lower wheel axle coupling portion 28 and 29. Frame portion 12 includes a forward connecting section 14 that fits to the portion of the bicycle frame that carries the seat. Holes are formed in forward connecting portion 14 to fixedly bolt frame portion 12 to the bicycle frame to stabilize frame portion 12 spaced outwardly from the wheel to be driven. Front metal strap members 16 and rear metal strap members 18 connect the upper frame portion 12 to lower battery platforms 26 and 27 mounted on either side of assembly 10. Platforms 26 and 27 are disposed substantially at the axis of wheel rotation with mounting brackets 28 and 29 connected to the axle of the wheel to which the assembly is mounted.

Respective platform tab members 26a and 26b, and 27a and 27b have openings therein to facilitate the tying down of any desired battery pack for use in driving motors 30 and 31 mounted on opposing sides of U-shaped carrier channel member 20. Travel range has been a major limitation for the general use of power assisted vehicles of the type disclosed herein. The unit of this invention provides three travel ranges depending on the battery selection. A light-duty battery will provide a 12 mile range, a medium-duty battery a 25 mile range, and the standard duty battery provides 40 miles of travel on level, hard surface terrain. Nearly all daily use of a bicycle, for example, is covered depending on the selected battery. The power unit can and is normally used in conjunction with some pedalling effort. The three ranges for each battery size can be increased by an additional 50% in actual use with pedalling.

Electric drive motors 30 and 31 include electrical connecting wires 32 and 33, respectively, that are coupled to each of the battery packs disposed on platforms 26 and 27. Manually-operated switch means (FIG. 6) is located between the battery units and connectors 32 and 33 on motors 30 and 31 so that power can be turned on and off as desired by the vehicle operator. The specific embodiment of this invention includes electrical wiring having battery connections and an electrical switch that attaches to the motor assembly via a connector between motors 30 and 31. The switch must be pressed to make the required electric connection for motor activation. When the switch means is released, the electrical connection is broken. The specific attention of the operator of the bicycle of this embodiment is thus required to activate the motors 30 and 31 as desired. This is a safety feature that precludes a runaway condition and simply augments the pedal action used to normally operate the bicycle equipped with assembly 10.

The U-shaped carrier member 20 rotatably supports drive rollers 34 and 35 on the shafts of electric motors 30 and 31 as shown. Drive rollers 34 and 35 may be of the same diameter or differing diameters and are directly mounted to the shafts of motors 30 and 31 mounted on pivotally mounted carrier member 20 that cams rollers 34 and 35 into positive engagement with the tire tread surface of the driven vehicle wheel 40 when motors 30 and 31 are activated.

Drive roller carrier member 20 pivots about horizontal axis 25 so that as wheel 40 (FIG. 5) rotates, it adjusts to any inherent variance in the circumferential radius of wheel 40. As carrier member 20 pivots about horizontal axis 25, it maintains a continuously in and out positive radial contact between drive rollers 34 and 35 and the tread portion of rotating vehicle wheel 40. Moreover, the manner in which carrier member 20 is mounted automatically adjusts to any back and forth movement of the outer circumferential tread portion in a direction parallel to the axis of wheel rotation. Rollers 34 and 35 are thus automatically adjusted to maintain complete frictional contact with the thread portion of wheel 40.

Roller carrier element 20 is a U-shaped channel having two drive roller carrying sections extending outwardly from an intermediate connecting section as shown. Carrier linking element 22 extends from a central assembly frame portion 15 in a direction toward vehicle wheel 40 and has an outer end section with two outer ends pivotally connected to horizontal pivot axis 25. Axis 25 extends in a direction parallel to the axis of wheel rotation with drive rollers 34 and 35 being disposed on opposing sides of horizontal pivot axis 25. Carrier element 22 is shiftable about a radial pivot axis so that drive rollers 34 and 35 maintain a continuous back and forth alignment with respect to the rotating vehicle wheel tread portion as described. The resultant automatic adjustment is effected by the limited rotational movement of carrier element 20 about a radial pivot axis, which is substantially normal to and extends through the axis of wheel rotation. The pivoting movement of carrier element 20 is also automatic about horizontal pivot axis 25 with drive rollers 34 and 35 disposed on opposing sides of both the radial pivot axis and horizontal pivot axis 25.

Electric drive motors 30 and 31 rotate drive rollers 34 and 35 on each of the motor drive shafts as shown. A central frame portion, generally designated 15, includes two metal strap frame members 15a and 15b that extend across the entire expanse of frame structure 12. Cross brace members 17 and 17a (FIG. 3) maintain the distance between side strap members 15a and 15b along with the U-shaped carrier linking element 22, which is pivotally mounted about upper pivot axis 23 with respect to frame members 15a and 15b. The outer end sections of carrier linking element 22 are pivotally attached to carrier element 20, which pivots about lower pivot axis 25.

Figure 3:
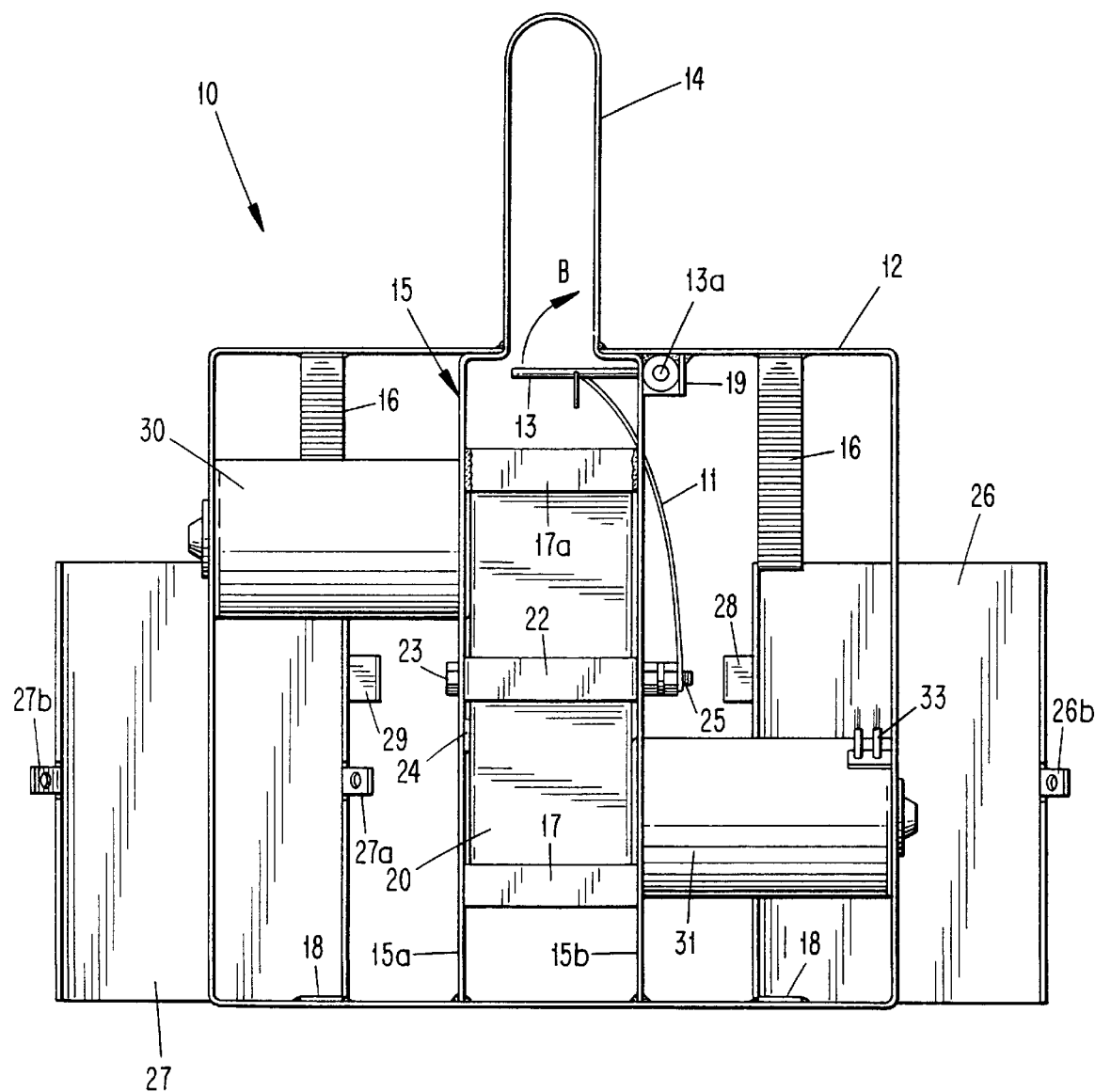
FIG. 3 is a top plan view of the assembly of the invention.
Figure 4:
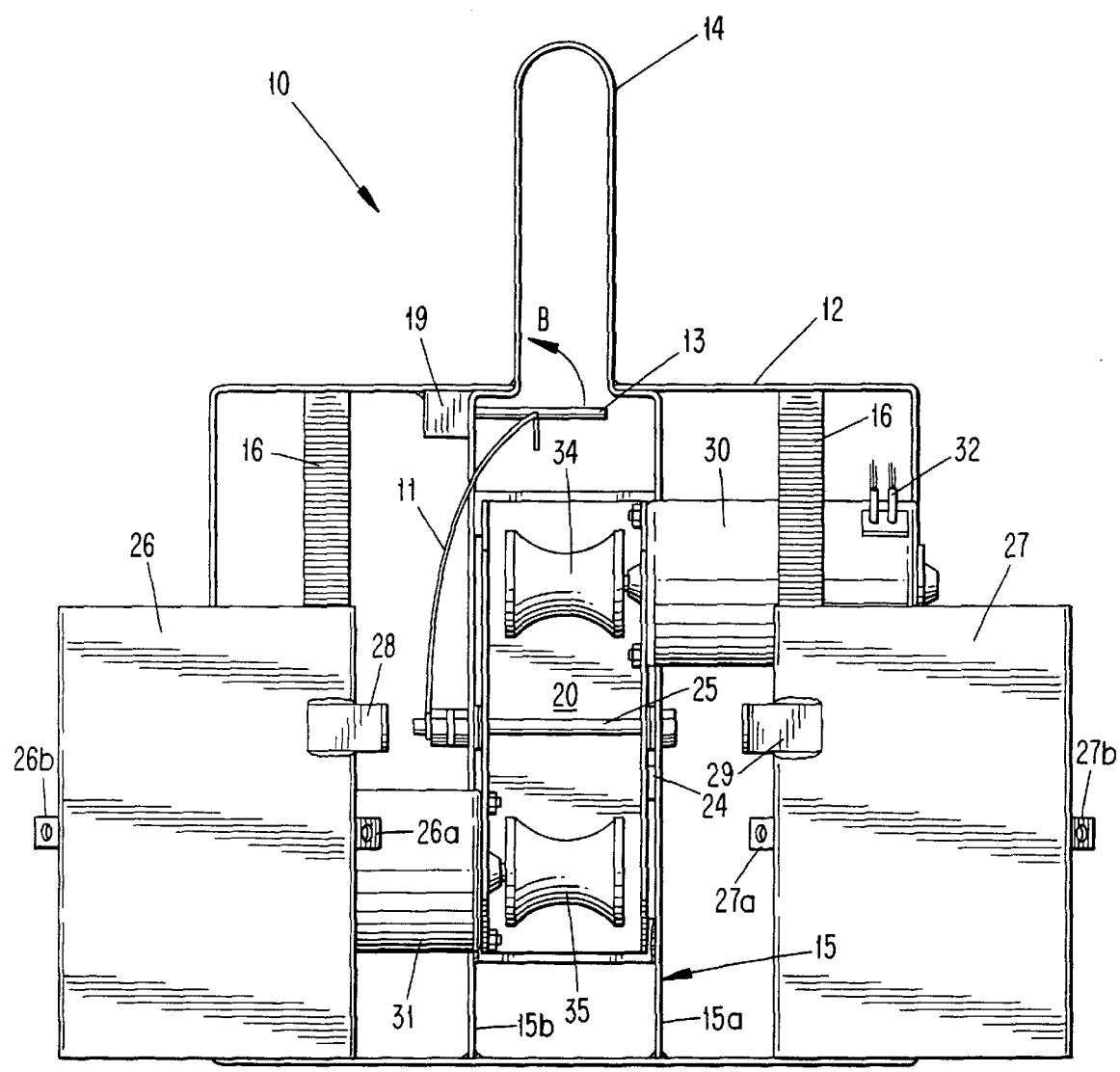
FIG. 4 is a bottom plan view of the assembly of the invention.

L-shaped lever 13 includes pivot leg 13a that is mounted vertically to pivot within bracket 19. Outer arm 13 rotates along the arc B (FIGS. 3 and 4) to pivot carrier linking element 22 about upper horizontal pivot axis 23 to move drive roller 34 and 35 into and out of contact with the tire tread portion. When lever 13 is rotated 90 degrees from the position in which it is shown in FIGS. 3 and 4, it pulls on coupling member 11 that is attached to the lower pivot axis thereby disengaging drive rollers 34 and 35 as they are carried upwardly with carrier element 20. When lever 13 is in the position shown, rollers 34 and 35 are in contact with the tire tread on either side of horizontal pivot axis 25. When drive motors 30 and 31 are activated by the vehicle operator, drive roller carrier element 20 moves in response to the resultant torque force of drive motors 30 and 31 and a camming movement of the drive roller carrier element 20 occurs in a direction opposite the travel direction of the vehicle. Camming movement limiting element 24 is contiguously disposed on side strap member 15a as shown. The radial pivot axis and horizontal pivot axes 23 and 25 are thus all maintained in plane A that extends through and in a direction parallel to the axis of wheel rotation.

Each drive roller 34 and 35 has a longitudinal axis that is parallel to the axis of wheel rotation for tire 40 when they are contiguous to the tire tread portion. Carrier linking element 22 and U-shaped carrier element 20 automatically adjusts with movable alignment of drive rollers 34 and 35 to any back and forth movement of the tire tread portion in a first direction parallel to the axis of wheel rotation, and further to any in and out movement of the tread portion in a second direction normal to the axis of wheel rotation to maintain substantially continuous frictional drive contact between drive rollers 34 and 35 and the tread portion. In operation, limiting member 24 fixes horizontal pivot point 25, upper pivot point 23, and the axis of wheel rotation in a plane A extending through those three points as shown in FIGS. 1 and 5. When lever 13 pivotally moves about pivot 13a on pivot bracket 19, carrier linking element 22 and carrier element 20 rotate about upper horizontal pivot axis 23 to engage and disengage drive rollers 34 and 35 and the tire tread portion.

In a specific embodiment, each roller 34 and 35 has a curved radius along its longitudinal length of 1 and ¾ inches and slip-fits onto the motor shaft of each respective motor 30 and 31. Each end of roller 34 and 35 has a ⅛ inch wide shoulder, and a set screw fixes it to the motor shaft. Once drive wheels 34 and 35 are set on the tire tread portion by rotating lever 13 causing it to swing about pivot 23, the carrier unit experiences a camming action to cause it to move in a direction opposite the travel direction of tire 40 flowing from the torque force of activated drive motors 30 and 31.

The motors of this invention require little or no lubrication over their service life. The mechanical pivot system may in certain conditions require an occasional drop of oil. The electrical system requires no maintenance for the wiring and the switch. The batteries require standard maintenance for the particular battery used which ranges from adding battery water and cleaning terminals to no maintenance when using sealed batteries. Standard recharging mechanisms may be used to eliminate potential problems related to battery life caused by overcharging and reducing the likelihood of charging the batteries too quickly.

The drive wheel design and mounting configuration provides excellent performance on wet tire surfaces and rough tread designs. This is particularly significant for travel on non-paved surfaces such as grass, trails, and soft ground, which is the specific terrain for which the mountain bike class of bicycles is designed.

The battery mounting frame is easily accessible and positioned as low as possible to maintain a low center of gravity for the vehicle so that a stable, safe operation of the vehicle may be maintained. The specific frame structure is designed to enable a user to upgrade the system to newer batteries or various types of batteries as they become available without any modification of the system to accommodate them.

In some prior art systems, the drive roller engages a tire when the operator presses a handlebar switch. The abrasive drive surface of the known drive roller, however, is spinning at a high rate of speed by the time it engages the tire thus causing significant tire wear. The dual wheel system of the invention, once installed, is or may be maintained in engagement with the tire wheel even when it is not in a driving mode. A minimum of slippage therefore occurs between the surface of the drive roller with the tire surface being driven when power is supplied to the drive motors for rotating the drive rollers.

While the POWER ASSIST ASSEMBLY FOR WHEELED VEHICLES has been shown and described in detail, it is obvious that this invention is not to be considered as limited to the exact form disclosed, and that changes in detail and construction may be made therein within the scope of the invention without departing from the spirit thereof.

What is claimed is:

1. An assembly for providing a direct frictional drive to the outer circumferential tread portion of a vehicle wheel, said assembly comprising:

a) support means for contiguously disposing two drive rollers laterally spaced with respect to each other at two separate locations against said tread portion for frictionally causing said vehicle wheel to rotate about an axis of wheel rotation, b) said support means including drive roller carrier means for rotatably supporting said drive rollers and being effective to maintain the drive rollers in frictional driving contact with the tread portion, c) said support means including coupling means floatingly connecting the drive roller carrier means to provide limited rotational movement of said drive roller carrier means about a radial pivot axis which is substantially normal to and extends through said axis of wheel rotation with each said drive roller being disposed with respect to each other on opposing sides of said radial pivot axis, said coupling means being effective to provide a continuous back and forth alignment of said drive rollers with respect to any back and forth movement of the tread portion in a first direction parallel to said axis of wheel rotation as the vehicle wheel rotates and connection means pivotally mounting the driver roller carrier means to the coupling means to maintain a continuously in and out positive radial contact between said drive rollers and the tread portion in response to any in and out movement of the tread portion in a second direction normal to said axis of wheel rotation of the rotating vehicle wheel, and d) electric power drive means mounted to said support means for rotating said drive rollers, e) said power drive means including electrically powered motor means, battery means, and electric coupling means for electrically connecting the battery to said motor means.

2. An assembly as defined in claim 1 wherein said vehicle is on a bicycle having a seat mounted to frame means, said vehicle wheel includes a hub portion having a wheel axle, a rim portion, and a tire portion having a tread surface, said support means includes assembly frame means having a drive roller carrier portion and a wheel coupling portion, said wheel coupling portion includes battery mounting means for mounting said battery means to said vehicle, and said support means includes means for attaching said support means to said bicycle frame means.

3. An assembly as defined in claim 1 wherein said support means includes an assembly frame portion laterally disposed outwardly from the vehicle wheel, and said coupling means mounts said drive roller carrier means to said outwardly disposed assembly frame portion and rotatably carries said two laterally spaced drive rollers at a fixed laterally spaced distance from and with respect to each other.

4. An assembly as defined in claim 1 wherein said drive roller carrier means comprises a roller carrier element including two drive roller carrying sections extending outwardly from an intermediate connecting section, said coupling means includes carrier linking means which extends from said assembly frame portion in a direction toward the vehicle wheel and has an outer end section, and said connection means rotatably connects the carrier roller element to the assembly frame portion to pivotally move the drive rollers about a horizontal pivot axis that extends in a direction parallel to said axis of wheel rotation with each said drive roller being disposed with respect to each other on opposing sides of said horizontal pivot axis.

5. An assembly as defined in claim 4 wherein said support means includes limiting means for maintaining the disposition of said radial pivot axis and said horizontal pivot axis in a plane that extends through and is parallel to said axis of wheel rotation.

6. An assembly as defined in claim 4 wherein said roller carrier element comprises an elongated U-shaped channel member having two parallel sidewall sections extending outwardly from a middle section with said drive rollers being rotatably mounted between the sidewall sections, and said carrier linking means includes a U-shaped connecting member having two linking arms each projecting along an opposing sidewall section of said U-shaped channel member and having outer free ends that are pivotally connected to said sidewall sections at said horizontal pivot axis.

7. An assembly for providing a direct frictional drive to the tread portion of a wheel on a vehicle, said assembly comprising:

a) carrier means for contacting two rotatably mounted drive rollers laterally spaced with respect to each other at two separate locations against said tread portion for both drive rollers to frictionally drive said vehicle wheel to rotate about an axis of wheel rotation when said drive rollers are drivingly rotated, b) said drive rollers each having a longitudinal axis that is parallel to said axis of wheel rotation when the drive rollers are contiguous to the tread portion, and c) carrier mounting means for allowing automatic adjustment of the carrier means to effect movable alignment of the drive rollers to any back and forth movement of the tread portion in a first direction parallel to said axis of wheel rotation and further to any in and out movement of the tread portion in a second direction normal to said axis of wheel rotation to maintain substantially continuous frictional drive contact between the drive rollers and said tread portion, and d) drive means for rotating said drive rollers when said rollers are in said frictional contact with the tread portion to cause rotation of said vehicle wheel, e) said carrier mounting means is effective to shift about a first axis extending radially outwardly from said axis of wheel rotation and to pivot about a second axis extending in a direction parallel to said axis of wheel rotation while maintaining each of the drive rollers on opposing sides of said first and second axes with respect to each other when said drive rollers are in frictional driving contact with the tread portion.

8. An assembly as defined in claim 7 wherein said carrier mounting means is effective to floatingly adjust the carrier means to provide a continuous back and forth alignment of said drive rollers with respect to said back and forth movement of said tread portion as the vehicle wheel rotates and being further effective to maintain a continuously in and out positive radial contact between said drive rollers and the tread portion in response to any in and out movement of said tread position of the rotating vehicle wheel.

9. An assembly as defined in claim 7 wherein said drive means includes electric motor means mounted to said carrier means for rotating said drive rollers.

10. An assembly as defined in claim 7 wherein each drive roller includes an outer circumferential surface having a smooth tire contact portion to minimize wear of the tread portion if there is any slippage between the circumferential surfaces of the drive wheels and said tread portion.

11. An assembly as defined in claim 7 wherein the outer circumferential surface of each drive roller includes an upwardly curved portion at each end of a smooth tire contact portion to provide a delimited amount of back and forth movement of the drive rollers in frictional contact with said tread portion.

12. An assembly as defined in claim 7 wherein the velocity of each of the rotating contiguous circumferential surfaces of the drive rollers and the driven vehicle wheel is maintained substantially the same to preclude slippage between the two contiguous surfaces and consequent wear of the outer cicumferential surface of the driven wheel.

13. An assembly for providing a direct frictional drive means for a wheeled vehicle having a vehicle frame whereby the drive means is in frictional contact with a vehicle wheel which includes a hub portion having a wheel axle, a rim portion, and a tire portion having a tread surface, said assembly comprising:

a) an assembly frame structure including an upper frame portion, an upper drive roller carrier portion, and a lower wheel axle coupling portion for attaching the assembly to a hub portion of the vehicle frame, b) said upper frame portion is connectable to the vehicle frame and said drive roller carrier portion rotatably supports at least one drive roller in frictional contact with the tread portion, c) drive motor means is mounted to said drive roller carrier portion to rotate each drive roller when the motor means is activated, d) mounting means for pivotally connecting said drive roller carrier portion to said upper frame portion so that the drive roller carrier portion moves in response to a torque force created when the drive motor means is activated to effect camming movement of the drive roller carrier portion to urge the at least one drive rolller against the tread surface and in a direction opposite a direction of rotation of the vehicle wheel, e) said upper frame portion including camming movement limit means for contiguously disposing said at least one drive roller against said tread surface at a roller driving position for frictionally causing said vehicle wheel to rotate about an axis of wheel rotation, and f) power supply means for operating said drive motor means.

14. An assembly as defined in claim 13 wherein said mounting means for said drive roller carrier portion is effective to provide a first continuous back and forth alignment of said at least one drive roller with respect to any back and forth movement of the tread portion as the vehicle wheel rotates and a second continuous in and out positive radial contact between said at least one drive roller and the tread portion in response to any in and out movement of the tread portion in a second direction normal to said axis of wheel rotation of the rotating vehicle wheel.

15. An assembly as defined in claim 13 wherein said drive motor means is electrically operated, and said power supply means includes battery means, coupling means for electrically connecting the battery means to said drive motor means, and switch means for turning the drive motor means on and off.

16. An assembly as defined in claim 15 wherein said battery means includes two battery units, and said frame structure includes means for mounting each of the battery units on opposing sides of the vehicle wheel being driven with each said battery unit being located on a wheel axle coupling portion at the lowest possible center of gravity for the vehicle on which the assembly is mounted.

17. An assembly as defined in claim 13 wherein two drive rollers laterally spaced with respect to each other are rotatable mounted to said drive roller carrier portion for frictionally contacting said tread portion at two separate locations, and said mounting means pivotally adjusts said drive rollers about a horizontal pivot axis in response to any radial variation in the vehicle wheel as it rotates around said axis of rotation which is parallel to said horizontal pivot axis.

18. An assembly as defined in claim 17 wherein said mounting means pivotally adjusts said drive rollers about a radial pivot axis that is disposed with said horizontal pivot axis in a plane that extends through and is parallel to said axis of wheel rotation.

* * * * *